Figure 1:
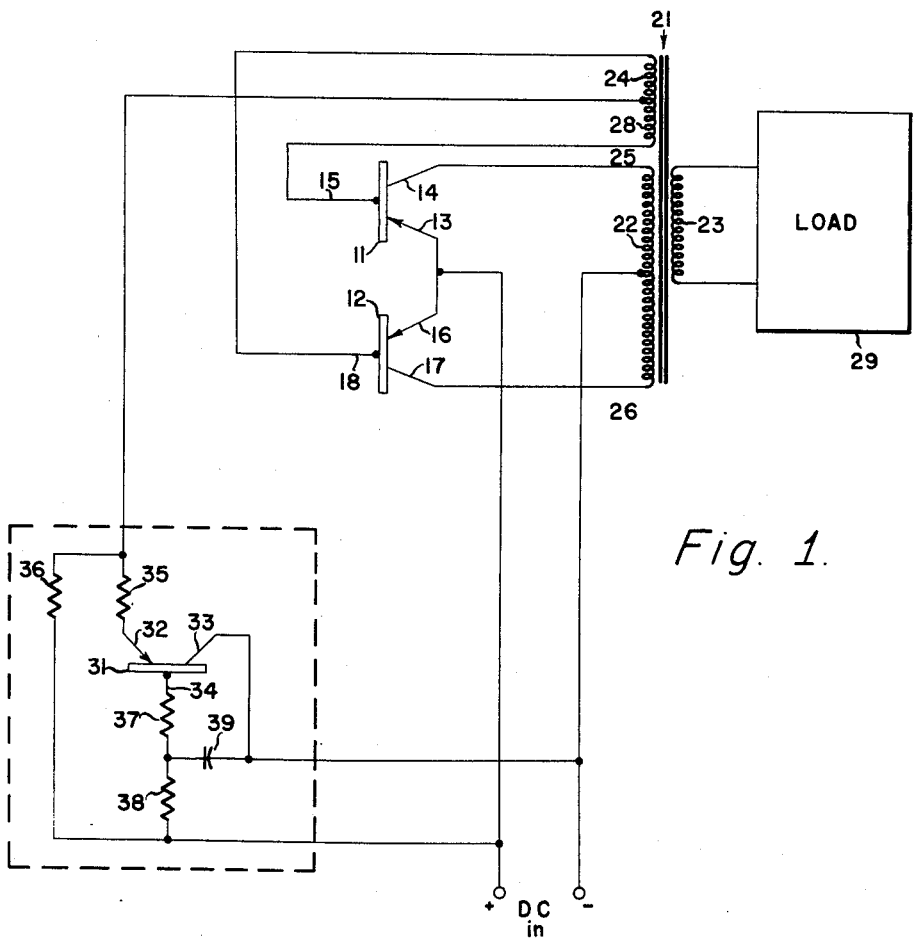

Jan. 26, 1960  E. K. DEAN  2,922,958
TRANSISTOR INVERTER WITH STARTER CIRCUIT
Filed May 12, 1958

Edward K. Dean,
*INVENTOR.*

BY.

*ATTORNEY.*

United States Patent Office 2,922,958
Patented Jan. 26, 1960

2,922,958

TRANSISTOR INVERTER WITH STARTER CIRCUIT

Edward K. Dean, Glendora, Calif., assignor, by mesne assignments, to Spectrol Electronics Corporation, a corporation of Delaware Application May 12, 1958, Serial No. 734,485

6 Claims. (Cl. 331—113)

This invention relates to transistor circuits and more particularly to a circuit for supplying starting current to a transistor inverter while at the same time protecting the transistor inverter in the event of current overloads to which it may be subjected.

Transistor inverter circuits, that is, circuits for converting D.C. voltage to A.C. voltage, are at the present time well known in the art. Circuits of the type referred to have been disclosed in Patents No. 2,783,384, issued February 26, 1957, to R. L. Bright et al., and No. 2,774,878, issued December 18, 1956, to J. L. Jensen. While circuits of the type disclosed in these patents, by way of example, work exceedingly well to perform the function for which they are intended, two main disadvantages have been found.

In the first instance, it has been found that these circuits do not always begin to oscillate in response to the application of voltage thereto, and particularly this is so if a heavy load is connected at the time of the application of potential. In the second instance, it has been found that even though the circuit may start properly, if there is sudden heavy current demand, such as that encountered when the load is shorted either momentarily or for a long period of time, the transistors making up the inverter have a tendency to run away. This results because the short which appears in the load is reflected as a dead short across the transistors. This causes current to be drawn by the transistors such that the temperature thereof tends to rise. This, in turn, causes additional current to flow and, in turn, causes a greater rise in temperature. Such is, therefore, termed thermal runaway. Thermal runaway may also result when a transistor is subjected to high ambient temperature. When such is done, additional current carriers are freed thereby. This, in turn, causes additional current and even higher temperature and the cycle above described occurs.

It is, therefore, an object of the present invention to provide a transistor inverter circuit which will start under load conditions and which will not be subject to thermal runaway in the event of short circuits appearing in the load connected thereto.

It is another object of the present invention to provide a transistor inverter circuit which will operate well under high ambient temperatures.

It is another object of the present invention to provide a circuit for automatically protecting transistor inverters from current overloads caused by short circuits appearing in the load connected to the inverter.

It is a further object of the present invention to provide a circuit for supplying starting current to transistor inverters to insure positive starting thereof even under heavy load conditions but which is electrically isolated from the inverter once the initiation of oscillations has been accomplished.

It is yet another object of the present invention to provide a circuit for assuring a positive starting of transistor inverters even under heavy load conditions and for automatically protecting such inverters from heavy current overloads while maintaining a high efficiency of operation.

A transistor inverter, in accordance with the present invention, includes a pair of transistors each having input, output and control electrodes. The input electrodes are interconnected and returned to a source of potential for forward biasing them. The output electrodes are interconnected through a coupling means which is connected to a source of potential for reverse biasing them. The control electrodes are interconnected through a feedback means. An additional transistor is connected between the feedback means and the source of potential for providing a momentary path for the flow of starting current. Connected in parallel with the additional transistor is a current path for the flow of base-collector reverse current in the event of a current overload.

Figure 2:
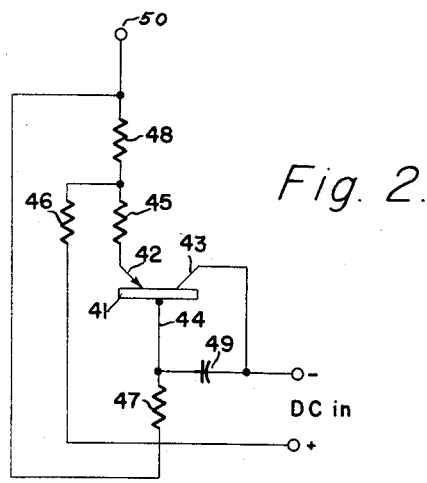

Other and more specific objects of the present invention will become apparent from a consideration of the following description taken in conjunction with the accompanying drawing in which:

Fig. 1 is a schematic circuit diagram of a preferred embodiment of the present invention; and Fig. 2 is a schematic circuit diagram of an alternate embodiment of the present invention.

Referring now to the drawing and more particularly to Fig. 1, there is shown a pair of transistors 11 and 12. Transistor 11 includes an emitter 13, a collector 14 and a base 15, while transistor 12 includes an emitter 16, a collector 17 and a base 18. Each of the transistors is a P–N–P type transistor, as indicated by the accepted schematic symbol therefor. Although the transistors as shown in the preferred embodiment are P–N–P type transistors, it is to be expressly understood that N–P–N type transistors may also be used. If such is done, the polarities of the potentials connected to the various electrodes should be reversed.

Emitters 13 and 16, which may be viewed as input electrodes, are interconnected and returned to the positive terminal of a source of direct current operating potential. Collectors 14 and 17, which may be viewed as output electrodes, are interconnected by primary winding 22 of transformer coupling means 21. The center tap of primary winding 22 is connected to the negative terminal of the potential source. Since the transistors are P–N–P type transistors, as shown in the drawing, the positive potential connected to the emitters will tend to forward bias them, while the negative potential connected to the collectors will tend to reverse bias them.

Also included as part of transformer coupling means 21 is a secondary winding 23 to which load 29 is connected. Feedback winding 24 has its terminals connected across the bases 15 and 18, which may be viewed as control electrodes, of transistors 11 and 12 respectively. The foregoing is a description of transistor inverter circuits as heretofore known in the art and as disclosed in the patents hereinabove referred to.

In the preferred embodiment of the present invention, there is also provided an additional transistor 31 having an emitter 32, a collector 33 and a base 34. Emitter 32 is connected by means of resistor 35 to the center tap of feedback winding 24. Collector 33 is connected to the negative terminal of the potential source. Base 34 is connected by way of resistors 37 and 38 to the positive potential source. A capacitor 39 is connected from the negative potential source to a point common to resistors 37 and 38 in the base circuit of transistor 31. Connected in parallel with transistor 31, between the center tap of feedback winding 24 and the positive terminal of the source of potential, is resistor 36. It will be seen that transistor 31 and resistor 36 provide two current paths for the transistor inverter. The first path includes resistor 35 and the emitter and collector of transistor 31, while the second current path includes resistor 36. The functioning of these two current paths will become more clear as the operation of the circuit is described hereinafter.

Referring now more particularly to the operation of the inverter circuit of the present invention, it will be seen that upon the application of operating potential to the terminals marked plus and minus, transistors 11 and 12 will each attempt to conduct. Due to inherent unbalance within the circuit, one of these transistors will conduct slightly greater than the other. Assuming for purposes of explanation only that transistor 11 begins to conduct slightly more than transistor 12, transistor 11 would quickly become saturated and transistor 12 cut off through the operation of feedback winding 24 under normal load conditions of the average transistor inverter circuit. However, if an unusually heavy load were connected to secondary 23 of transformer 21, this operation may not ensue.

Even though an exceptionally heavy load is connected to the transistor inverter, it will begin to oscillate in the accepted manner by utilization of the present invention. This positive starting will be accomplished as follows. Upon the application of the operating potential to transistors 11 and 12, the potential is also applied to transistor 31. Transistor 31, therefore, immediately begins to conduct, causing current to flow in the normal manner therethrough. This current flow will be amplified in transistors 11 and 12, thus assuring that current will begin to flow through them. Due to the inherent unbalance in the circuit, transistor 11, by way of assumption and for purposes of explanation only, will conduct slightly more than transistor 12. Transistors 11 and 12 will, therefore, begin to oscillate as more fully explained hereinafter.

Current will, however, flow through transistor 31 only for a very short period of time. This results because current will flow from the positive terminal of the source of potential through resistor 38 and capacitor 39 to the negative source of the potential at the same time that current is flowing through transistor 31. This will cause capacitor 39 to assume a charge which is equal to the source of potential. The time required for capacitor 39 to assume this charge is dependent upon the time constant of resistor 38 and capacitor 39. When the capacitor has assumed this charge, a positive potential equal to that of the source will be applied to base 34 of transistor 31, thus biasing transistor 31 substantially to cut off. It is, therefore, seen that transistor 31 provides a temporary current path for the flow of starting current, and that after the inverter has begun to oscillate in the accepted manner, transistor 31 is electrically isolated from the inverter.

Returning now to transistors 11 and 12 and the manner in which they function as a transistor inverter, it is seen that when transistor 11 saturates it effectively connects the source of potential between the center tap of primary winding 22 and terminal 25 thereof causing current to flow effectively from emitter 13 to collector 14 through the upper half of winding 22 and back to the source. This creates such a potential in the feedback winding as to cause transistor 11 to continue to conduct and transistor 12 to remain cut off. Since the core of transformer 21 is constructed of magnetic material having a substantially rectangular hysteresis loop, current will continue to flow in the manner above described until the core of transformer 21 becomes saturated. At this point it will be unable to support additional voltage, thus causing the magnetic flux created by the above-described flow of current to collapse and, in turn, causing the voltage appearing across feedback winding 24 to reverse. This will cause transistor 11 to cut off and transistor 12 to begin conducting. Transistor 12 will very quickly become saturated, and transistor 11 will very quickly become non-conducting. This then will connect the source of potential effectively between center tap of primary winding 22 and terminal 26 thereof, thus causing current to flow from the source through emitter 16 and collector 17 through the lower half of winding 22 and back to the source. This, in turn, causes the potential appearing across feedback winding 24 to be such as to sustain conduction in transistor 12 and non-conduction in transistor 11. This current flow will continue until the rectangular hysteresis loop magnetic material in the core of transformer 21 becomes saturated in the reverse direction, thus causing the state of transistors 11 and 12, as to conduction and non-conduction, to once more reverse. This process of oscillation will continue so long as the operating conditions of the circuit remain normal.

Assume now that a heavy current overload occurs such as, for example, that which would occur if load 29 were short circuited as by connecting a wire across the terminals of secondary winding 23. Such a condition would reflect a dead short across primary winding 22 as well. This will, in turn, cause oscillations to cease. If an inverter circuit of the type referred to in the patents hereinabove cited were being used, at this point excessive emitter to collector current would flow through each of the transistors 11 and 12 as a result of this dead short, thus causing thermal runaway and, as a result thereof, destruction of the transistors. In the present invention, however, emitter to base current, as a result of the short, will flow through the parallel current path provided by resistor 36, thus supplying this leakage current. Because of this leakage current path, excessive emitter to collector current will not flow but will be limited. This, therefore, will preclude thermal runaway and thus will prevent destruction of transistors within the inverter.

A transistor inverter embodying the circuit of the present invention, as shown in Fig. 1, was subjected to a dead short for a period in excess of eight hours without injury of any sort to the components and without indication of thermal runaway. It should be noted that the prevention of thermal runaway is accomplished by keeping each of the base electrodes of transistors 11 and 12 isolated from the negative terminal of the source of potential at all times except for the initial period prior to the charging of capacitor 39. This is accomplished, as hereinabove discussed, by cutting off any conduction through transistor 31 after the initial period.

Although the circuit of Fig. 1 works exceedingly well in almost all applications, it has been found that when certain transistors are utilized under some operating conditions there may be difficulty in obtaining complete cut off of transistor 31. In order to assure complete cut off, therefore, an alternative embodiment, as illustrated in Fig. 2, may be utilized in such cases.

Referring now more particularly to Fig. 2, there is shown a transistor 41 having emitter 42, collector 43 and base 44. Collector 43 is connected to the negative terminal of the supply source, while emitter 42 is connected by way of series connecting resistors 45 and 48 to terminal 50. It should be clear at this point that terminal 50 is connected to the center tap of feedback winding 24 and that the circuit as shown in conjunction with transistor 41 will, in those cases desired, replace the circuit in conjunction with transistor 31.

A capacitor 49 is connected between base 44 and the negative terminal of the supply source. A resistor 47 is connected from base 44 to terminal 50 while another resistor 46 is connected to a common point between resistors 45 and 48 and to the positive terminal of the supply source.

The operation of the circuit of Fig. 2 is identical to that of Fig. 1, hereinabove described, except as follows. The charge time of capacitor 49 will be determined by the time constant of resistors 46, 47 and 48 and capacitor 49. Furthermore, even if some current does tend to flow upon short circuit conditions, it will flow through resistors 48 and 46, thus causing terminal 50 to be more positive. Thus, by connecting base 44 to terminal 50, it in turn will be more positive than emitter 42 after the initial period. This then assures complete cut off of transistor 41 under all conditions and thereby protects transistors 11 and 12 and also transistor 41 from any thermal runaway.

It is to be understood that the values for the components as shown in the drawing may vary according to any particular design consideration. The following values are given by way of example only for the circuit as shown in Fig. 2 taken in conjunction with the remainder of the inverter of Fig. 1 and are not intended in any manner as a restriction upon the present invention.

| | |
|---|---|
| Transistors 11 and 12 | 2N–618 Motorola. |
| Transformer 21 | Arnold 6180 D2 core. |
| Primary winding 22 | 50 turns. |
| Secondary winding 23 | 321 turns. |
| Feedback winding 24 | 8 turns. |
| Transistor 41 | General Electric type 2N44. |
| Resistor 45 | 220 ohms. |
| Resistor 46 | 5 ohms. |
| Resistor 47 | 1000 ohms. |
| Resistor 48 | 2.5 ohms. |
| Capacitor 49 | 25 microfarads. |
| Source of potential | 30 volts D.C. |

There has been thus disclosed a preferred embodiment of the present invention which provides for positive starting of a transistor inverter circuit and at the same time provides protection to the transistor inverter in the event of heavy current overloads or high ambient temperatures.

What is claimed is:

1. A transistor inverter circuit comprising: first and second transistors each having input, output and control electrodes, a source of potential, said input electrodes being interconnected and returned to said source, transformer means including first and second windings, said output electrodes being interconnected through said first winding and returned to said source, feedback means connected to said control electrodes, first and second current paths, means including said feedback means for connecting said current paths between said control electrodes and said source of potential, said first current path including a third transistor having an emitter, a collector and a base, said collector being connected to a first terminal of said source for reverse biasing it, means including said second current path for connecting said emitter to a second terminal of said source for forward biasing it, and means connected between said terminals and to said base for biasing said third transistor to cut off a predetermined time after application of potential thereto.

2. A transistor inverter circuit as defined in claim 1 wherein said second current path includes a resistor and said means for biasing said third transistor to cut off includes a resistor and a capacitor connected in series between said terminals and said base of said third transistor is connected to a common point between said resistor and capacitor.

3. A transistor inverter circuit as defined in claim 1 wherein said first current path includes a first resistor connected between said emitter and said feedback means, said second current path includes a second resistor, and said means for biasing said third transistor to cut off includes a capacitor connected in series with said first and second resistors and between said terminals.

4. In a transistor inverter circuit including a pair of transistors connected with a transformer so as to convert a direct current voltage source into alternating current voltage and including emitter, base and collector electrodes, the improvement for effecting positive starting and protecting from circuit overloads comprising: a first current path connected between said base electrodes and said source, a second current path connected in parallel with said first path and including a transistor having input, output and control electrodes, said input and output electrodes connected to be forward and reversed biased respectively, means connected to said control electrode to automatically isolate said transistor from said inverter circuit a predetermined time after said direct current voltage is applied thereto.

5. In a transistor inverter circuit including a pair of transistors connected with a transformer so as to convert a direct current voltage source into alternating current voltage and including emitter, base and collector electrodes, the improvement for effecting positive starting and protecting from circuit overloads comprising: a third transistor including a third emitter, a third collector and a third base, means for connecting said third emitter to said base electrodes, said third collector being connected to a first terminal of said source, a first resistor and a capacitor connected in series across said source, said third base being connected to a common point between said resistor and capacitor, a second resistor connected between said base electrodes of said inverter circuit and a second terminal of said source.

6. In a transistor inverter circuit including a pair of transistors connected with a transformer so as to convert a direct current voltage source into alternating current voltage and including emitter, base and collector electrodes, the improvement for effecting positive starting and protecting from circuit overloads comprising: a third transistor including a third emitter, a third collector and a third base, first and second series connected resistors for connecting said third emitter to said base electrodes, said third collector being connected to a first terminal of said source, a capacitor connected between said first terminal and said third base, a third resistor connected between a second terminal of said source and a common point between said first and second resistors, means including said first and third resistors for connecting said third base to said second terminal.

References Cited in the file of this patent

UNITED STATES PATENTS

| | | |
|---|---|---|
| 2,669,677 | Entwisle | Feb. 16, 1954 |
| 2,852,730 | Magnuski | Sept. 16, 1958 |
| 2,854,582 | Guyton | Sept. 30, 1958 |